431-225
BEST AVAILABLE COPY
W. H. SMITH.
Vapor-Burner.
No. 8,686. Reissued April 22, 1879.
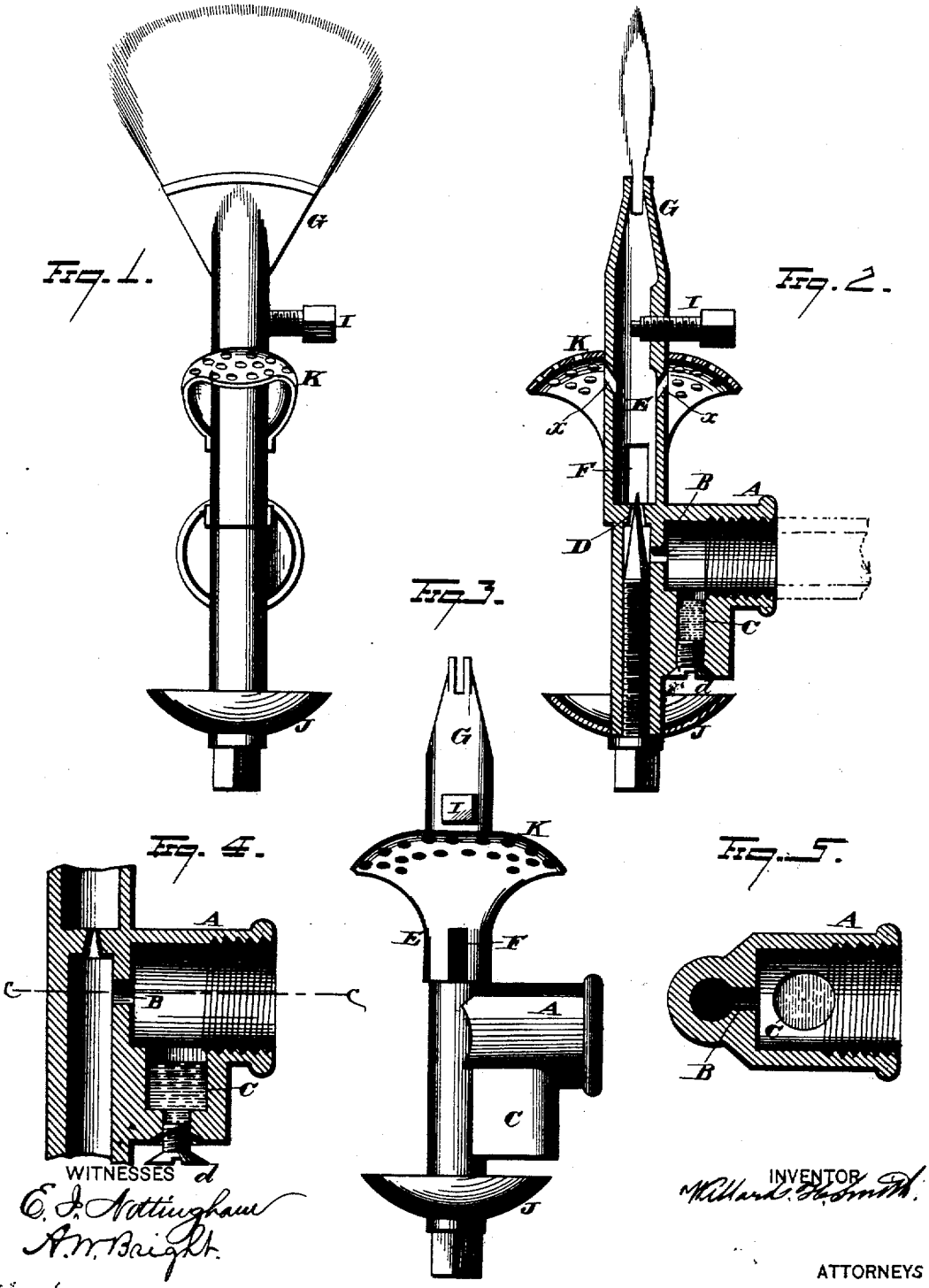
WITNESSES
E. F. Nottingham
A. W. Bright.
INVENTOR
William H. Smith.
ATTORNEYS
Copy in Gas Fitting
N. PETERS, PHOTO-LITHOGRAPHER, WASHINGTON, D. C.

ILLUMINATING BURNER
Liquid Fuel Burners, Vapo
R[redacted]

UNITED STATES PATENT OFFICE.

WILLARD H. SMITH, OF BROOKLYN, NEW YORK.

IMPROVEMENT IN VAPOR-BURNERS.

Specification forming part of Letters Patent No. 79,404, dated June 30, 1868; Reissue No. 3,607, dated August 17, 1869; Reissue No. 8,437, dated September 24, 1878; Reissue No. 8,686, dated April 22, 1879; application filed February 18, 1879.

*To all whom it may concern:*

Be it known that I, WILLARD H. SMITH, of the city of Brooklyn, county of Kings, State of New York, have invented certain new and useful Improvements in Vapor-Burners; and I do hereby declare that the following is a full, clear, and exact description of the same, reference being had to the accompanying drawings, making a part of this specification, in which—

Figure 1 represents a side elevation of the improved burner; Fig. 2, a vertical section of the same; Fig. 3, another side elevation; Fig. 4, a vertical longitudinal section through the tube, receptacle, and valve-chamber; Fig. 5, a horizontal section through the apparatus on the line *c c* of Fig. 4.

My invention consists, first, in providing a receptacle or sediment-chamber below the oil-passage, and in communication therewith, whereby solid matter, water, or other impurities in the oil will be arrested or intercepted, and prevented from passing into the burner and clogging its gas-passages; secondly, in providing the burner with a perforated heater in the form of a perforated flange or flanges projecting above one or more gas-passages leading from the interior of the air or gas tube, whereby heat is more effectually communicated to the burner, a stronger air-draft maintained through the air-tube, and vaporization of the oil more perfectly accomplished and maintained, the result being a better and more steady light, and the perforations in the heating-flanges affording a means for automatically relighting the gas should it become accidentally extinguished, and for maintaining vaporization during the period in which the main flame may be extinguished; thirdly, in bringing the sides of the perforated heater outward and downward along the tube outside of said gas-passages, so as to shield or protect the said jets, and to extend the heating-surfaces to supply heat requisite for generating the vapor.

A is the tube to which the feed-pipe is attached, and forms a part of the oil-passage from the reservoir to the burner. B is the opening through which, primarily, the oil enters the burner, but which, subsequently, when the burner has become heated, is the point at which the liquid vaporizes, the heat being so intense at this point that where the liquid stream is diminished, as it here is, the heat dissipates it at once into vapor as it emerges into the body of the burner. On the oil-passage back of the opening B, and between the said opening and reservoir, is arranged a receptacle or sediment-chamber, C, so that the water, solid materials, and other impurities held in suspension by or mingled with the oil will be here intercepted and collected, and prevented from passing into the interior of the burner, or into the vapor-passages. *d* is a plug or screw, by removing which access may be had to the said receptacle C for the purpose of removing or drawing off the said impurities from time to time. From the opening B the vapors pass through the usual valve D into the air-tube E, which is provided with the ordinary air-passages F F, through which the air is furnished, and then mixed with the vapors of the oil to form the inflammable compound. This latter then passes on to the usual flattened and constructed top end, G, of the burner and air-tube.

I represents the air-regulating screw in the air-tube, and J is the usual cup for receiving alcohol, light oil, or overflow for the first heating of the burner to set it in operation.

Now, in order to produce a better light, more especially in cold weather, and therefore to provide a burner which shall generate and maintain a higher degree of vaporizing heat than those heretofore in use, I employ the perforated heaters on the air-tube E. These heaters are shown at K K, and are in the nature of perforated flanges. They extend out over the gas-passages *x x*. The gas or mingled vapor and air passing through *x x*, beneath the flanges K K, emerges from and is burned at the perforations *x x*. The heat thus generated is conducted downward upon the other parts of the burner, and thereby a sufficient degree of heat is maintained to vaporize the oil as it enters the burner, and keep it in a highly-heated condition until it reaches the flame. The perforated flanges therefore assist, by maintaining an auxiliary flame and source of heat, to encourage more perfect vaporization, a better draft of air, and better light as a result.

The flanges K K are provided with openings, which allow the gas from the jets *x x* to burn both upon the outside and inside of the flange, thereby creating a greater amount of heat than the ordinary heaters. The sides of the flanges K K are bent downwardly upon the tube, leaving the sides open, as shown in Fig. 1.

By this arrangement the gas-jets issuing through the passages *x x* are, so to speak, housed, and should they be accidentally extinguished the draft created through the perforations in the flanges K K will bring the vapor of the jets upward to the flame of the burner, so as to relight the jets through the perforations, thereby preventing the burner from cooling off, and letting the fluid run out when left without attention. As the sides of the flanges K K are brought down to the tube A a larger heating-surface is also obtained.

I am aware that there has heretofore been shown and described a discharge-neck closed by a removable plug or stopper, and placed in the pipe leading from the elevated reservoir to the burner of a lamp; but this device was intended to serve as a means of empyting the reservoir, and was not intended or adapted for any other purpose; nor was the lamp one that required a trap. It was, moreover, placed in front of the regulating-valve, and no means were provided for preventing the passage through and beyond said valve of such impurities as might be contained in the fluid.

What I claim is—

1. The combination, with a vapor-burner, of a receptacle or sediment-trap, located back of the gas-passage, below the oil-supply pipe, and between the regulating-valve and the reservoir.

2. The combination, with a vapor-burner, of a receptacle or sediment-trap, located below the oil-supply pipe, back of the regulating-valve, and between the point of vaporization and the reservoir, and communicating with said supply-pipe.

3. The combination, with a vapor-burner, of a receptacle or trap communicating with the oil-supply pipe, and located below said pipe, back of the regulating-valve, and between the point of vaporization and the reservoir, said trap being provided with means for drawing off or removing the water, sediment, or other impurities that may have collected within it.

4. In combination with a vapor-burner, a trap outside of the burner, placed on and in communication with the supply-pipe, back of the regulating-valve, and at a point intermediate between the reservoir and the point at which the supply-tube communicates with the burner.

5. The air-tube E, provided, between the air-passages F F and the base of the flame, with perforated heaters consisting of the passages *x x* and perforated heat-conducting flange or flanges K K, substantially as and for the purposes described.

6. The perforated heater K, having the sides thereof extended downwardly upon the tube E, substantially as and for the purposes described.

In testimony whereof I hereunto sign my name in the presence of two witnesses.

WILLARD H. SMITH.

Witnesses:
GEO. D. SEYMOUR,
FRANK GALT.